United States Patent [19]

O'Dell

[11] 4,442,442
[45] Apr. 10, 1984

[54] DATA SYNCHRONIZATION SYSTEM FOR GRAPHIC RECORDING APPARATUS

[75] Inventor: Gary B. O'Dell, Aloha, Oreg.
[73] Assignee: Tektronix, Inc., Beaverton, Oreg.
[21] Appl. No.: 337,197
[22] Filed: Jan. 5, 1982
[51] Int. Cl.³ ............................................ G01G 15/14
[52] U.S. Cl. .................................................... 346/136
[58] Field of Search .................... 346/1.1, 76, 108, 136

[56] References Cited

U.S. PATENT DOCUMENTS

| | | | |
|---|---|---|---|
| 3,275,208 | 9/1966 | Poumakis | 346/136 X |
| 3,605,111 | 9/1971 | Schmoll | 346/136 X |
| 4,038,664 | 7/1977 | Muir | 346/136 X |
| 4,172,259 | 10/1979 | Lowe | 346/136 X |
| 4,245,228 | 1/1981 | Cook | 346/1.1 X |

FOREIGN PATENT DOCUMENTS 1035342 7/1966 United Kingdom ............. 346/76 S

Primary Examiner—Donald A. Griffin
Attorney, Agent, or Firm—John D. Winkelman; John Smith-Hill

[57] ABSTRACT

A system for recording graphic information, stored in digital form in a data memory, on a moving record medium comprises a controller which is responsive to the travel rate of the moving record medium to supply digital signals from the data memory to a recording member in synchronization with the movement of the record medium.

4 Claims, 5 Drawing Figures

U.S. Patent   Apr. 10, 1984   Sheet 3 of 3   4,442,442
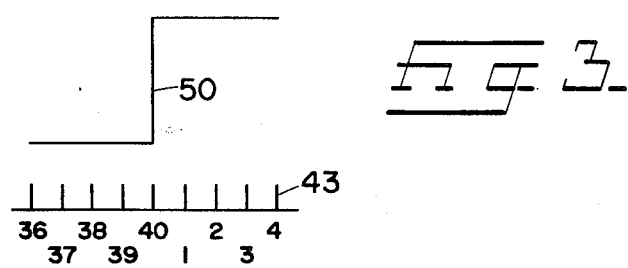
_Fig 3_
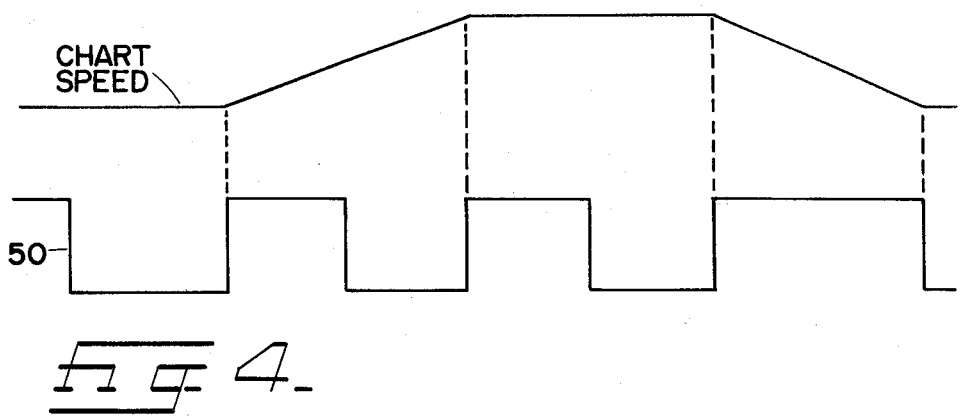
_Fig 4_
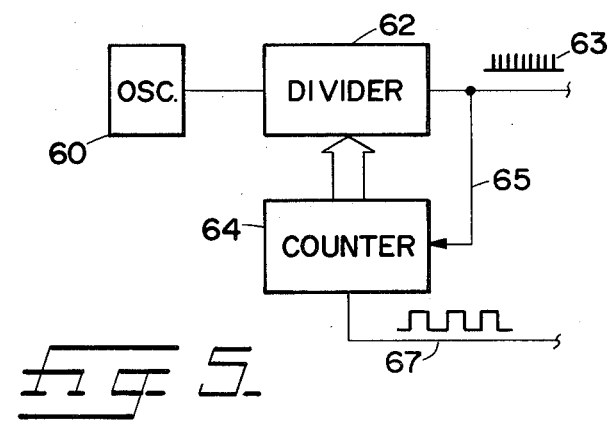
_Fig 5_

DATA SYNCHRONIZATION SYSTEM FOR GRAPHIC RECORDING APPARATUS

BACKGROUND OF THE INVENTION

1. Field of the Invention

The present invention is concerned generally with data recording systems, and more particularly with systems for recording graphic information on a moving record medium.

2. Description of the Prior Art

Many types of graphic data recording systems are in commercial use today, including ones in which information is recorded photographically, electrographically, xerographically, magnetically, and by other equally well-known techniques. In one of the oldest and perhaps most widely used methods, a sheet of paper or other suitable record medium is moved past an electrically- or electromagnetically-driven writing element, such as an inked pen, a heated stylus or the electron beam of a cathode-ray tube (CRT). Electrical signals representative of data to be recorded cause the writing element to be deflected across the moving record medium to produce a line or series of marks forming a graphic image. As is well known, however, it is not possible to obtain highly accurate and uniform images with such a system unless the record medium travels at a constant speed relative to the rate information is written on it.

One way to minimize variations in the travel rate of a moving record medium is to use a very high quality drive mechanism that includes a constant speed motor, precision gearing, and an accurately machined transport assembly. The cost of such mechanisms generally restricts their use to low volume, special purpose applications.

An alternative approach is to compensate in some manner for velocity fluctuations caused by motor speed changes, friction, gear eccentricity and other conditions that affect the medium travel rate. Several record medium velocity compensation methods have been described in earlier issued patents. For example, U.S. Pat. No. 3,701,995 to Geerling describes a system used in a time domain reflectometer (TDR) cable tester to ensure that graphic images produced by the instrument's chart recorder correlate with those displayed on its CRT. Included in the system are means for generating a series of fixed-duration pulses at a rate proportional to the movement of the chart recorder's record medium. The pulses are converted to a stairstep analog signal that serves as a reference for the generation of a slow-rise voltage ramp having an identical slope. The slope of the ramp signal, which is used both for horizontal deflection of the CRT's electron beam and for timing the sampling of input signals received by the cable tester, thus is controlled by the travel rate of the record medium, eliminating the effect of variations in its velocity.

U.S. Pat. No. 4,172,259 to Lowe discloses a graphic recording system in which a light sensitive record sheet is drawn across the outer surface of a fiber optic strip set in the faceplate of a CRT. Images are written on the sheet by scanning the CRT's electron beam back and forth along the phosphor-backed inner surface of the strip and intensity modulating the beam in accordance with the data to be recorded. To compensate for irregular or uneven movement of the light-sensitive sheet, the disclosed system includes means for sensing the sheet's instantaneous velocity and for deflecting the electron beam in the direction of sheet movement as it is being scanned in a substantially perpendicular direction along the fiber optic strip. The beam is deflected to the extent necessary to eliminate the effects of short term velocity changes on the recorded images.

U.S. Pat. No. 3,395,401 to Silverman is concerned with digital information recording systems of a type wherein the information to be recorded is received at irregular intervals, and the record medium is advanced intermittently to record the information at uniformly-spaced locations along the medium's direction of travel. Limits on recording speed imposed by the inertia of the record medium and its drive system are overcome, according to the patent's teachings, by shifting the recording means (e.g., a light beam or magnetic tape recording head) along the medium's direction of travel concurrently with the intermittent advancement of the medium.

Finally, U.S. Pat. No. 3,893,616 to Trousdale describes a digital controller that extends the performance capability of digitally controlled electromechanical plotters by regulating the rate at which plot commands are transferred from a data source to the plotter. The controller feeds the plot commands to the plotter at established optimum velocity and acceleration rates for the device.

SUMMARY OF THE INVENTION

The present invention is broadly directed to a method and apparatus for recording graphic image information, stored in digital form, on a moving record medium in synchronization with the travel rate of the medium. Such apparatus suitably may include, according to the invention, storage means for storing digital signals representative of an image to be recorded, recording means for transcribing digital signals on a moving record medium, means for producing an electrical signal related to the travel rate of the moving medium, and control means responsive to the travel rate-related signal for supplying digital signals from the storage means to the recording means in synchronization with the travel rate of the record medium.

According to a preferred embodiment of the invention, a motor-driven strip chart recorder is provided with means for sensing movement of the record medium and generating a digital signal related to its velocity. A digital microprocessor, operating under program control, periodically samples the velocity-related signal and compensates for any detected variations by adjusting the repetition rate (frequency) of a clock signal that controls the timed transfer of graphic image data from a digital data memory to the chart recorder. Thus, the digital control processor corrects for record medium speed variations by adjusting the rate at which stored image data is transferred to the recorder. Practice of the invention does not require the use of a programmed microprocessor or microcomputer. According to an alternative embodiment of the invention, equivalent digital control of the image data transfer rate is accomplished using discrete circuitry.

A more complete understanding of the present invention and its various features, advantages and objectives may be had by referring to the following detailed description and the accompanying drawings.

BRIEF DESCRIPTION OF THE DRAWINGS

FIGS. 3 and 4 show certain timing relationships in the FIG. 1 system; and

FIG. 5 is a block diagram of an alternative digital controller for the FIG. 1 data synchronization system.

DETAILED DESCRIPTION

Figure 1:
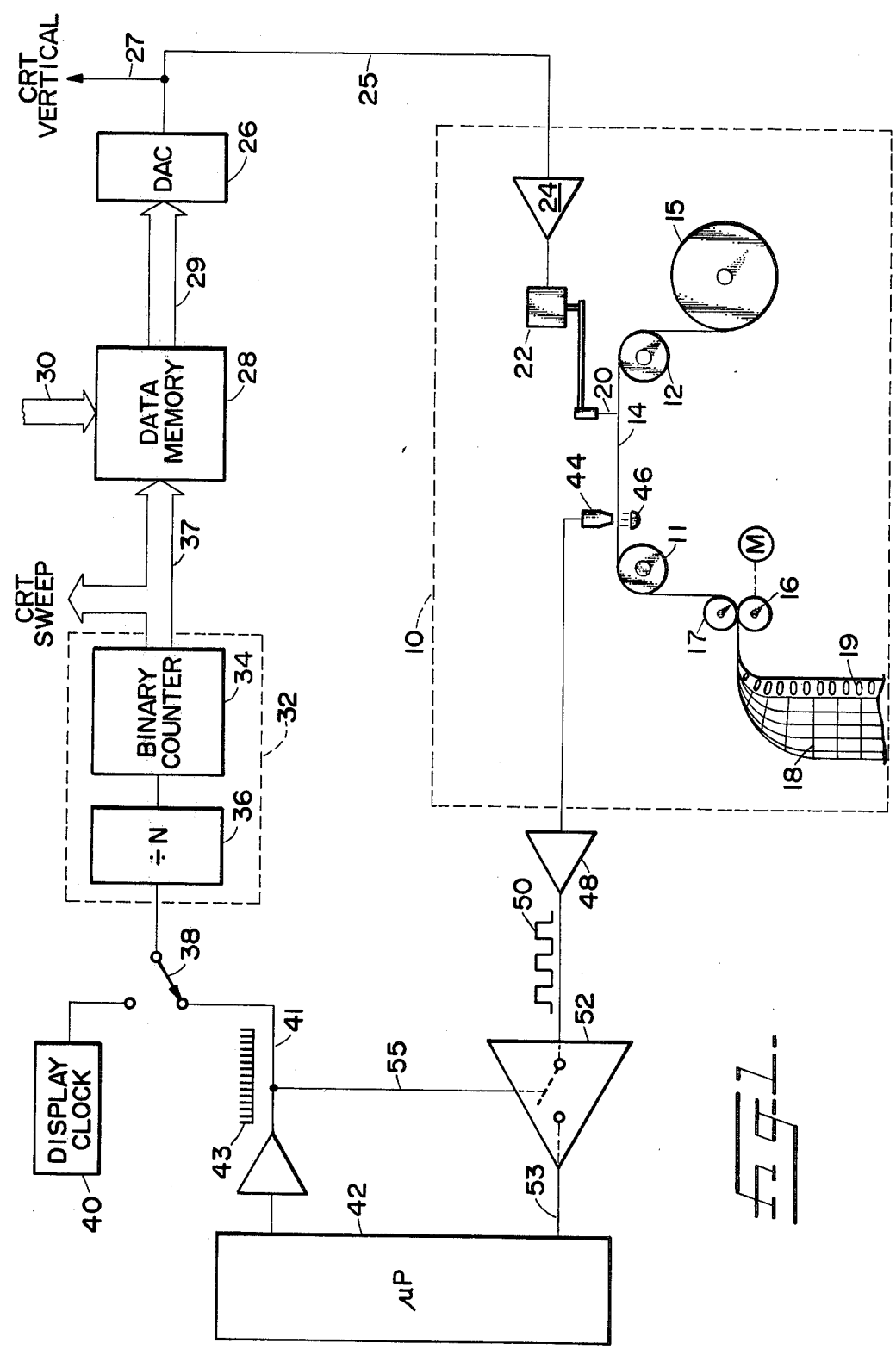
FIG. 1 is a diagrammatic representation of a chart recorder and associated data synchronization system according to a preferred embodiment of the present invention.

Referring now to the drawings, a graphic data recorder and associated synchronization system provided in accordance with a preferred first embodiment of the invention is shown in FIG. 1. The illustrated recorder and synchronization system form part of a microprocessor-controlled fiber optic time domain reflectometer (FOTDR). Such instruments are used to measure loss characteristics, and to locate and detect faults, in multimode optical fibers.

A FOTDR of the type herein described suitably includes an optical light pulse generator for applying short duration (on the order of 10–50 ns) pulses of infrared light to an optical fiber under test. As the light pulses travel through the fiber, a portion of the transmitted radiant energy is reflected back to the input of the FOTDR. Such reflections are converted to electrical signals, suitably processed and displayed on a CRT, where fiber transmission loss and distance measurements can be made. The instrument functions basically as a sampling oscilloscope with digital storage. Incoming optical signals (i.e., reflections) received in response to a train of outgoing infrared pulses are converted to analog electrical signals and sampled sequentially until enough amplitude data have been collected to display a representative pulse reflection waveform. The samples, each of which is converted to a corresponding digital signal, are stored in a digital waveform memory. Stored waveform data is transferred by a display controller to the CRT or, when the operator wants a permanent record, to an integral strip chart recorder. For clarity, FIG. 1 depicts only those portions of the FOTDR that are concerned with the recording apparatus and associated data synchronization system of the present invention.

Figure 2:
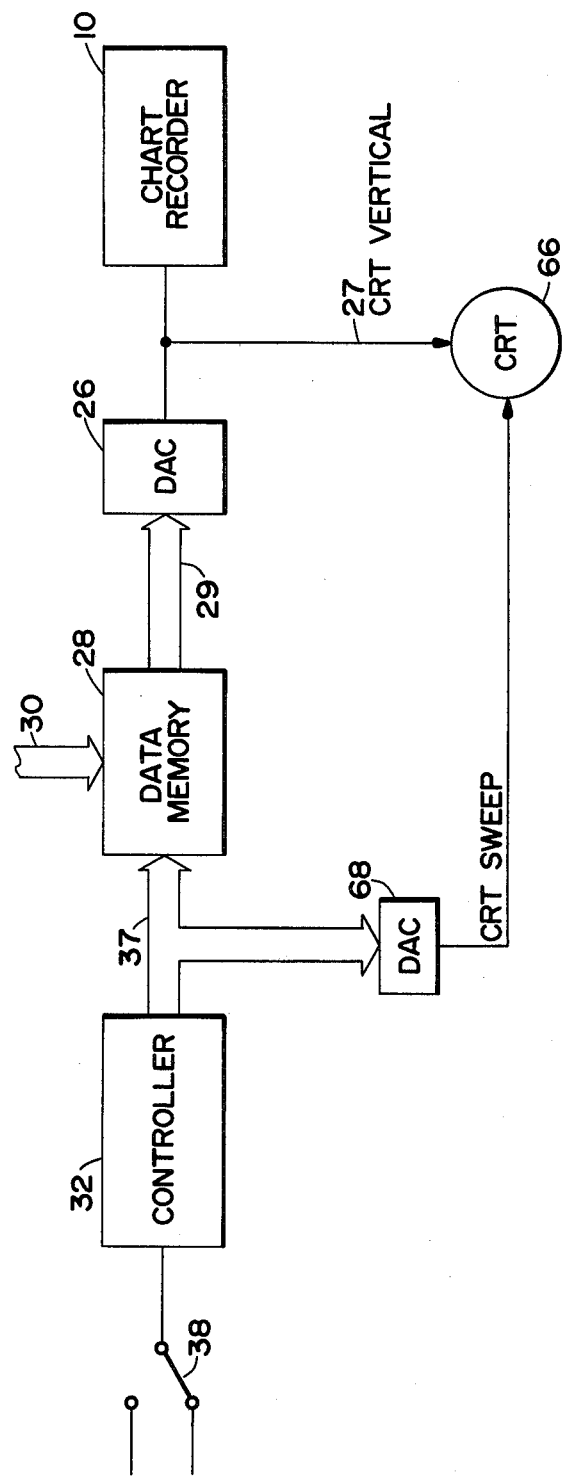
FIG. 2 is a simplified block diagram showing the interrelation between the chart recorder and the CRT of a fiber optic time domain reflectometer.

The strip chart recorder, shown in simplified, schematic form at 10, is of conventional construction and includes a pair of idler rollers 11, 12 supporting a strip of chart paper, or record medium, 14. The record medium is drawn from a supply reel 15 by a motor-driven paper feed roller 16 and associated pinch roller 17. To permit quantitative loss and distance measurements on recorded waveforms, calibration grid lines 18 are printed on one face of the chart paper (the upper face in the figure). The grid lines suitably correspond in number and relative spacing to the graticule lines on the face of the reflectometer's CRT 66 (FIG. 2). Uniformly-spaced sprocket holes 19 are provided along one or both edges of chart paper 14, preferably outside the grid lines. Information is written on the chart strip by a pen, or stylus, 20 driven by a pen motor 22 in response to control signals received from a pen drive amplifier 24.

Input signals to the pen drive amplifier are received via a signal line 25 from a digital-to-analog converter (DAC) 26, herein a 10-bit multiplying DAC. The analog output signal from DAC 26 also is coupled by a line 27 to the CRT vertical deflection amplifier (not shown) of the FOTDR. Stored digital signals representing waveform amplitude samples are supplied to DAC 26 from a digital waveform memory 28 via data output lines 29. The waveform amplitude points produced during the earlier-described sampling process are received by memory 28 over data input lines 30 after having been converted to 10-bit digital words by an analog-to-digital converter (not shown) connected to the sampler.

Data is read out of the waveform memory by a display controller 32 that includes an address counter 34 and a divider circuit 36. A clock signal coupled to the input of the divider circuit, which may be a four-bit Johnson counter such as a type CD4018, is reduced in frequency by a factor N to provide a suitable address timing signal to counter 34. The address counter, herein a type 4040 binary counter, sequentially scans each address location in waveform memory 28 via address lines 37 coupled to the output of the binary counter. The output of address counter 34 also is connected to a digital-to-analog converter 68 (FIG. 2) to produce a current ramp that is then amplified to provide horizontal sweep for the instrument's CRT.

Clock signals are supplied to display controller 32 via a two-position switch 38. In one switch position, divider circuit 36 is connected to a fixed frequency clock source 40 for displaying stored waveform data on the CRT. In the other switch position, shown in the figure, the divider circuit is connected via a buffered "function select" line 41 to a microprocessor 42. When thus connected to produce a chart recording of data stored in memory 28, microprocessor 42 generates a clock signal 43 that is varied in frequency to synchronize the addressing of the waveform memory to the travel rate of record medium 14. Movement of the chart paper is detected by a photoelectric sensor 44 disposed to receive light transmitted through sprocket holes 19 by a light-emitting diode or other suitable source 46.

Sensor 44, herein a photosensitive transistor, generates an on-off signal as individual sprocket holes pass between the sensor and light source 46. This on-off signal, which is proportional in frequency to the chart paper speed, is shaped and converted to appropriate digital logic levels by a buffer amplifier 48. The output signal 50 from buffer 48 is sampled by a solid state switch 52 connected between the buffer and a data bus line 53 for microprocessor 42. Sampling signals are coupled to the switch, herein a type 80C98 three state buffer, by a line 55 connected to function select line 41. Each clock pulse generated by microprocessor 42 closes switch 52 momentarily, thus in effect sampling the chart speed-related signal from buffer 48 at the frequency of clock signal 43.

Operation of the above-described system will now be described in greater detail, again with reference to FIG. 1. The FOTDR incorporating the present invention is a microcomputer-based instrument, and microprocessor 42 thus controls all of its main operating functions. For example, when an operator desires to record a waveform displayed on the instrument's CRT and pushes a front panel RECORD button, the microprocessor initiates a series of command signals to (1) blank the CRT, (2) place switch 38 in the position shown in the drawing, (3) activate the chart recorder drive motor and (4) generate a clock signal 43 on function select line 41 to read the waveform data stored in memory 28 and sample the chart speed-related signal from sensor 44.

Clock signal 43 is generated by the execution of a software routine stored in the instrument's program memory (not shown). The clock signal generation routine forms no part of the present invention, and accordingly is not reproduced herein. For the purpose of explanation, however, such a routine may include (a) loading a given number into an internal register, (b) decrementing the register until the stored number equals zero, and (c) thereupon generating a clock pulse on line 41. The same sequence is executed repeatedly to produce a clock signal 43 of a selected initial repetition rate. As will thus be evident, the frequency of the clock signal will be determined by the number loaded into the register initially and the time required for the microprocessor to execute the outlined sequence.

In order to synchronize the reading of data in memory 28 (and its subsequent writing on record medium 14) to the travel rate of the record medium, the system of the invention as embodied herein seeks to produce a constant number of clock pulses during the interval between successive sprocket holes in medium 14. The microprocessor accomplishes this by counting the number of clock pulses produced during the period between successive leading, or rising, edges of waveform 50, and adjusting the number loaded into the count-down register at the start of the clock pulse generation routine on the basis of a stored algorithm.

Assume for the sake of example that the number loaded into the microprocessor's internal register results in the generation of 40 pulses between successive sprocket holes when the chart paper is traveling at a given "normal" rate. The microprocessor begins counting the pulses upon its detection of a rising edge in waveform 50 via sampling of the waveform by switch 52, as illustrated in FIG. 3. When the next succeeding rising edge is detected, the counter is reset to zero and the accumulated value is used to recalculate the number loaded into the register at the start of a pulse generation cycle. If the travel rate of the chart paper increases for some reason, as shown in FIG. 4, fewer than 40 pulses will have been generated by the time the next rising edge of waveform 50 occurs. Execution of the stored algorithm will then result in a proportionally smaller number being loaded into the count-down register, producing a corresponding increase in the frequency of clock signal 43. In a similar manner, a decrease in the velocity of medium 14 will cause the pulse count to increase, and execution of the algorithm will cause a larger number to be loaded into the count-down register, decreasing the generated clock signal frequency.

In the above-described manner, microprocessor 42 generates a clock signal 43 that varies in frequency with the travel rate of record medium 14, thus synchronizing the addressing of memory 28 (and the recording of the stored waveform) to the movement of the record medium.

Divider circuit 36 is provided in the data synchronization system to allow waveform 50, which has a nominal frequency of about 2 Hz, to be sampled at a rate high enough to prevent significant sampling inaccuracy. Assuming it requires 10 seconds to produce a chart recording of an image stored in waveform memory 28, and the image data consists of only 250 amplitude values, memory data must be read out at a 25 Hz rate. If the addressing signal were to be generated directly at the 25 Hz rate, i.e., if divider circuit 36 were eliminated, waveform 50 would not be sampled at a rate high enough for accurate detection of each rising edge. The use of divider circuit 36, which herein is set to divide the clock signal frequency by eight, permits the use of a 200 Hz clock frequency for accurate sampling of the chart speed-related waveform. The divider would of course, not be needed in a system where the required memory addressing rate is sufficiently higher than the frequency of the sampled waveform.

FIG. 5 illustrates an alternative, second embodiment of the invention not requiring the use of a programmed microprocessor to synchronize the writing of stored digital data to the travel rate of a moving record medium. In this embodiment, an oscillator 60 generates a fixed frequency signal that is coupled to a programmable divider 62. The output of the divider is a clock signal 63 corresponding to signal 43 in the FIG. 1 embodiment. The division ratio of divider 62 is controlled on the basis of the number of clock pulses generated between successive leading edges of the chart speed-related waveform 50. A gated counter 64 accumulates a count of the clock pulses received via a line 63 coupled to the output of divider 62. The count is transferred to the programmable divider over lines 65 upon the generation in the counter of a gating pulse corresponding to the arrival via line 67 of a leading edge in waveform 50. The gating pulse also initializes the counter to zero, whereupon it again starts a count of the clock pulses output from divider 62. In a manner analogous to the FIG. 1 embodiment, increases and decreases in the pulse count between successive chart medium sprocket holes cause corresponding changes in the frequency of the divider's output signal, which is used to time the addressing of the stored waveform memory.

Although the synchronization method of the invention has been described herein, by way of example, as embodied in a fiber optic time domain reflectometer, it should be understood that the invention is applicable to a wide variety of graphic data recording systems where data, stored in digital form, are recorded on a moving medium. It will also be apparent to those skilled in the relevant art that various changes and modifications may be made in the embodiments described to achieve the same result. Therefore, the full scope of the invention is defined only by the terms of the appended claims, and is not limited to the particular examples described herein.

I claim as my invention:

1. A system for recording graphic image information, stored in digital form, on a moving record medium, comprising:

storage means for storing digital signals representative of an image to be recorded, digital-to-analog converter means for converting digital signals read out from the storage means into corresponding analog signals, recording means for transcribing analog signals on a moving record medium, means for producing a pulse train having a repetition frequency proportional to the travel rate of the moving medium, means for determining the period of the pulse train, and means for supplying digital signals from the storage means to the recording means by way of the converter means at a rate dependent on the period of the pulse train.

2. A system according to claim 1, wherein the determining means comprise a digital processor for generating clock pulses at a rate dependent on the period of the pulse train, and the supplying means comprise a memory controller which is operable under control of the clock pulses to provide address information to the storage means for reading said digital signals from the storage means and supplying them to the converter means.

3. A system according to claim 2, comprising a cathode ray tube display device for providing a display of the graphic image information, said cathode ray tube display device having a horizontal sweep input which is connected to receive the address information provided by the memory controller and a vertical deflection input which is connected to receive analog signals provided by the converter means, and wherein the system further comprises a display clock for generating clock pulses at a constant repetition rate, and selector means for connecting the display clock to the memory controller in order to provide a display of the image information on the display device.

4. A system according to claim 1, wherein the determining means comprise means for sampling the pulse train at the frequency of the clock signal, and the digital processor comprises means for adjusting the frequency of the clock signal in dependence on the result of the sampling.

* * * * *